US011729635B2

(12) United States Patent
Mishra et al.

(10) Patent No.: US 11,729,635 B2
(45) Date of Patent: Aug. 15, 2023

(54) MOBILE BASE STATION DRIVE TEST OPTIMIZATION

(71) Applicant: Parallel Wireless, Inc., Nashua, NH (US)

(72) Inventors: Rajesh Kumar Mishra, Westford, MA (US); Randy Rutherford, Bedford, NH (US); Babak Jafarian, Nashua, NH (US); Steven Brigmann, Overland Park, KS (US); Christopher Simmonds, Andover, MA (US)

(73) Assignee: Parallel Wireless, Inc., Nashua, NH (US)

( * ) Notice: Subject to any disclaimer, the term of this patent is extended or adjusted under 35 U.S.C. 154(b) by 258 days.

(21) Appl. No.: 15/984,318

(22) Filed: May 18, 2018

(65) Prior Publication Data

US 2018/0338250 A1   Nov. 22, 2018

Related U.S. Application Data

(60) Provisional application No. 62/507,984, filed on May 18, 2017.

(51) Int. Cl.
*H04W 24/02* (2009.01)
*H04W 24/10* (2009.01)
(Continued)

(52) U.S. Cl.
CPC ........ *H04W 24/02* (2013.01); *H04W 24/10* (2013.01); *H04W 28/0226* (2013.01);
(Continued)

(58) Field of Classification Search
CPC ..... H04W 24/02; H04W 24/10; H04W 84/18; H04W 88/08; H04W 84/005; H04W 28/0226; H04W 36/22
See application file for complete search history.

(56) References Cited

U.S. PATENT DOCUMENTS 5,867,813 A   2/1999  Di Pietro et al.
6,751,457 B1  6/2004  Martin
(Continued)

FOREIGN PATENT DOCUMENTS

EP   1045601 A1   10/2000
EP   1654625 B1   5/2016

OTHER PUBLICATIONS

"Huawei ME909u-521 LTE LGA Module" Application Guide, Feb. 28, 2014, Huawei Technologies Co., Ltd.

*Primary Examiner* — Redentor Pasia
(74) *Attorney, Agent, or Firm* — Michael Y. Saji; David W. Rouille

(57) ABSTRACT

A method is disclosed, comprising: collecting, at an in-vehicle base station, reports from a plurality of user equipments (UEs); storing, at the in-vehicle base station, reports collected from the plurality of UEs into a database; forwarding, from the in-vehicle base station to a coordinating server, stored reports into the database; performing, at the coordinating server, data analysis of the received reports; and sending, from the coordinating server to a base station, an instruction to update at least one configuration parameter of the base station, thereby improving data collection and data processing for radio frequency cell optimization.

20 Claims, 6 Drawing Sheets

(51) Int. Cl.
  *H04W 84/00*   (2009.01)
  *H04W 28/02*   (2009.01)
  *H04W 36/22*   (2009.01)
  *H04W 84/18*   (2009.01)
  *H04W 88/08*   (2009.01)

(52) U.S. Cl.
  CPC ......... *H04W 36/22* (2013.01); *H04W 84/005* (2013.01); *H04W 84/18* (2013.01); *H04W 88/08* (2013.01)

(56) References Cited

U.S. PATENT DOCUMENTS

| | | | |
|---|---|---|---|
| 8,195,166 B1* | 6/2012 | Oprescu-Surcobe | H04W 76/27 455/436 |
| 8,699,430 B2 | 4/2014 | Chandramouli et al. | |
| 8,781,797 B1 | 7/2014 | Oltman et al. | |
| 9,209,857 B2 | 12/2015 | Galeev et al. | |
| 9,848,089 B2* | 12/2017 | Bhatia | H04W 24/10 |
| 10,034,189 B2* | 7/2018 | Futaki | H04W 72/085 |
| 10,057,790 B2* | 8/2018 | Mehrgardt | H04W 24/02 |
| 2003/0048791 A1 | 9/2003 | De Crodder et al. | |
| 2004/0203459 A1* | 10/2004 | Borras-Chia | H04W 24/02 455/67.13 |
| 2008/0075003 A1 | 3/2008 | Lee et al. | |
| 2008/0268833 A1 | 10/2008 | Huang et al. | |
| 2008/0311927 A1* | 12/2008 | Boman | H04W 64/00 455/456.1 |
| 2009/0215443 A1* | 8/2009 | Dickey | H04W 24/08 455/424 |
| 2009/0270079 A1 | 10/2009 | Han et al. | |
| 2010/0005178 A1 | 1/2010 | Sindelaru et al. | |
| 2010/0110886 A1 | 5/2010 | Somi et al. | |
| 2011/0163914 A1* | 7/2011 | Seymour | G01S 19/34 342/357.42 |
| 2012/0113837 A1 | 5/2012 | Siomina et al. | |
| 2012/0113844 A1 | 5/2012 | Krishnamurthy | |
| 2012/0142351 A1* | 6/2012 | Takayanagi | H04W 24/02 455/436 |
| 2012/0269062 A1* | 10/2012 | Cho | H04L 47/263 370/230 |
| 2013/0003697 A1 | 1/2013 | Adjakple et al. | |
| 2013/0072146 A1 | 3/2013 | Smith | |
| 2013/0084809 A1 | 4/2013 | Johansson et al. | |
| 2013/0128778 A1* | 5/2013 | Bennett | H04W 36/08 370/277 |
| 2013/0272274 A1* | 10/2013 | Ishida | H04W 72/082 370/336 |
| 2013/0301468 A1 | 11/2013 | Lee et al. | |
| 2014/0073306 A1 | 3/2014 | Shetty et al. | |
| 2014/0087739 A1* | 3/2014 | Weaver | H04W 16/18 455/436 |
| 2014/0146697 A1 | 5/2014 | Kim et al. | |
| 2014/0206341 A1 | 7/2014 | Siomina et al. | |
| 2014/0226513 A1* | 8/2014 | Hapsari | H04W 16/18 370/252 |
| 2014/0228062 A1* | 8/2014 | Rubowitz | H04W 4/12 455/466 |
| 2014/0317456 A1* | 10/2014 | Kim | H04L 43/0847 714/48 |
| 2014/0342752 A1* | 11/2014 | Jones | G01S 5/021 455/456.1 |
| 2015/0018003 A1* | 1/2015 | Zhou | H04W 4/33 455/456.1 |
| 2015/0056931 A1 | 2/2015 | Yerramalli et al. | |
| 2015/0056995 A1* | 2/2015 | Baillargeon | H04W 36/22 455/436 |
| 2015/0092578 A1 | 4/2015 | Ingale et al. | |
| 2015/0103755 A1 | 4/2015 | Cui et al. | |
| 2015/0181449 A1* | 6/2015 | Didenko | H04W 24/10 455/67.11 |
| 2015/0207700 A1* | 7/2015 | Elmdahl | H04W 24/10 370/241.1 |
| 2015/0296391 A1 | 10/2015 | Koltar et al. | |
| 2015/0334750 A1* | 11/2015 | Mehta | H04W 24/10 370/329 |
| 2015/0365838 A1* | 12/2015 | Zhang | H04W 24/10 370/252 |
| 2016/0094968 A1* | 3/2016 | Papa | H04W 52/143 455/404.1 |
| 2016/0262092 A1 | 9/2016 | Lee | |
| 2016/0277992 A1* | 9/2016 | Cao | H04W 28/0808 |
| 2016/0298969 A1* | 10/2016 | Glenn, III | G01C 21/206 |
| 2016/0373944 A1* | 12/2016 | Jain | H04L 43/08 |
| 2017/0013513 A1 | 1/2017 | Agarwal et al. | |
| 2017/0019846 A1* | 1/2017 | Su | H04J 11/0069 |
| 2017/0164322 A1* | 6/2017 | Shaw | H04W 16/10 |
| 2018/0096587 A1 | 4/2018 | Erman et al. | |
| 2018/0146392 A1* | 5/2018 | Toskala | H04W 24/10 |
| 2018/0176810 A1* | 6/2018 | Thangarasa | H04W 76/11 |
| 2018/0270688 A1* | 9/2018 | Jung | H04B 17/345 |
| 2018/0324742 A1 | 11/2018 | Agarwal et al. | |
| 2019/0141573 A1* | 5/2019 | Boström | H04W 72/52 |
| 2021/0345135 A1 | 11/2021 | Bendlin et al. | |

\* cited by examiner

MOBILE BASE STATION DRIVE TEST OPTIMIZATION

CROSS-REFERENCE TO RELATED APPLICATIONS

This application claims the benefit under 35 U.S.C. § 119(e) of U.S. Provisional App. No. 62/507,984, titled "Mobile Base Station Drive Test Optimization," and filed May 18, 2017, which is hereby incorporated by reference herein in its entirety. This application also hereby incorporates by reference in their entirety for all purposes U.S. Pat. Pub. No. US20140133456, titled "Dynamic Multi-Access Wireless Network Virtualization" and published May 15, 2014; U.S. Pat. Pub. No. US20140233412A1, titled "Methods of incorporating an Ad Hoc Cellular Network into a Fixed Cellular Network"; U.S. Pat. Pub. No. US20150257051, titled "Federated X2 Gateway" and published Sep. 10, 2015; and U.S. Pat. Pub. No. US20160142880A1, titled "Enhanced Mobile Base Station"; U.S. Pat. Pub. No. US20160135132, "Self-Calibrating and Self-Adjusting Network"; and U.S. patent application Ser. No. 15/974,669, "Base Station with Interference Monitoring Circuit".

BACKGROUND

To develop highly-performing radio frequency networks, it is desirable to test them. One common way to do so is by conducting a drive test. A drive test involves performing radio frequency testing while driving (or walking, biking, etc.). Data is collected on vehicle movement, using a laptop with collecting software installed connected to at least one mobile phone, a GPS for collecting latitude and longitude of each measurement point, and optionally a scanner for collecting supplemental information. The vehicle is assigned a predetermined route, which may be sketched out on a map. Tests may be performed in the day to assess the network when loaded, and at night to assess peak performance. Data is collected at the laptop and downloaded when the vehicle returns to the company headquarters, as test files are typically many gigabytes or more.

Tests may be made by performing calls (voice, data, video, etc.), on one or more radio access technologies (GSM, CDMA, UMTS, LTE, Wi-Fi), short or long. RF measurements may be collected as required for the purpose of the test, with each data point tagged with time and date as well as location. Typically two phones are used, one in a connected mode but not active, and one to perform the call. Longer calls can be used to verify handovers between cells. The objective of the drive test may be performance analysis, integration of new sites, assessment of parameters of existing sites, benchmarking, etc.

Examples of drive tests as known in the prior art are found at European Patent Publication No. EP1045601A1, U.S. Pat. Nos. 5,867,813, 6,751,457, 8,781,797, and U.S. Pat. Pub. No. US20090215443A1, which are hereby incorporated by reference in their entirety, and which functions and features are understood to be encompassed by the drive test functionality described in the present disclosure.

SUMMARY

In a first embodiment, a method is disclosed, comprising: collecting, at an in-vehicle base station, reports from a plurality of user equipments (UEs); storing, at the in-vehicle base station, reports collected from the plurality of UEs into a first database; forwarding, from the in-vehicle base station to a coordinating server, stored reports into a second database at the coordinating server; performing, at the coordinating server, data analysis of the received reports; and sending, from the coordinating server to a base station, an instruction to update at least one configuration parameter of the base station. The in-vehicle base station forwards the stored reports to the coordinating server via a wireless backhaul link. The reports comprise radio reports and performance reports. The radio reports may be analyzed for radio frequency planning of a plurality of base stations. The performance reports may be utilized for improving user applications performance statistics at the plurality of UEs for throughput and latency, thereby improving data collection and data processing for radio frequency cell optimization.

The radio reports include location of the in-vehicle base station and measurement of at least one of: Reference Signal Received Power (RSRP), Reference Signal Received Quality (RSRQ), and Reference Signal Received Quality (RSRQ). The performance reports include location of the in-vehicle base station and measurement of at least one of: latency, throughput, statistics of successful or failed connection attempts, statistics of call completion at a user equipment (UE). The instruction to update the configuration parameter may be at least one of to change transmit power level at the base station, update antenna alignment, handover of a user equipment (UE) of the plurality of UEs to a neighbor base station, allow or deny the UE services of the base station. The in-vehicle base station may have radio access network deactivated.

The forwarding, from the in-vehicle base station to the coordinating server, of the stored reports occurs when the in-vehicle base station has backhaul link Quality of Standard (QoS) measurement above a threshold set by an operator of the core network. The method may further comprise: calculating, at the coordinating server, bandwidth usage of a mesh network of a plurality of base station; and determining, at the coordinating server, change in number of base stations of the mesh network. The method may further comprise: determining, at the coordinating server, based on the data analysis, a geographic location having RF measurement statistics below a threshold set by an operator of the core network; sending, from the coordinating server to the in-vehicle base station, instruction to drive to the geographic location; and activating, at the in-vehicle base station, radio access network to allow the plurality of UEs to attach to the in-vehicle base station to access the core network. At least one user equipment (UE) of the plurality of UEs may be running an application to report radio frequency measurements and application performance results to the base station, the base station sends reports from the UE to the coordinating node for performing analysis.

The method may further comprise sending, from the coordinating server to the in-vehicle base station, instruction to provide radio access to the plurality of UEs upon determining the in-vehicle base may be at emergency location. The method may further comprise sending, from the coordinating server to the in-vehicle base station, instruction to activate relay mesh node functionality. The method may further comprise activating, at the in-vehicle base station, radio access interface for a UE to attach to the in-vehicle base station; and collecting, at the in-vehicle base station, measurement of interference with neighbor cells and radio frequency (RF) measurement reports including one or more of EARFCN, signal strength, PLMN ID, PCI, and ECGI. The in-vehicle base station may be a multi-radio access technology (multi-RAT) base station supporting at least two access technologies of 2G, 3G, 4G, 5G, Wi-Fi, and WiMax.

DETAILED DESCRIPTION

Figure 1:
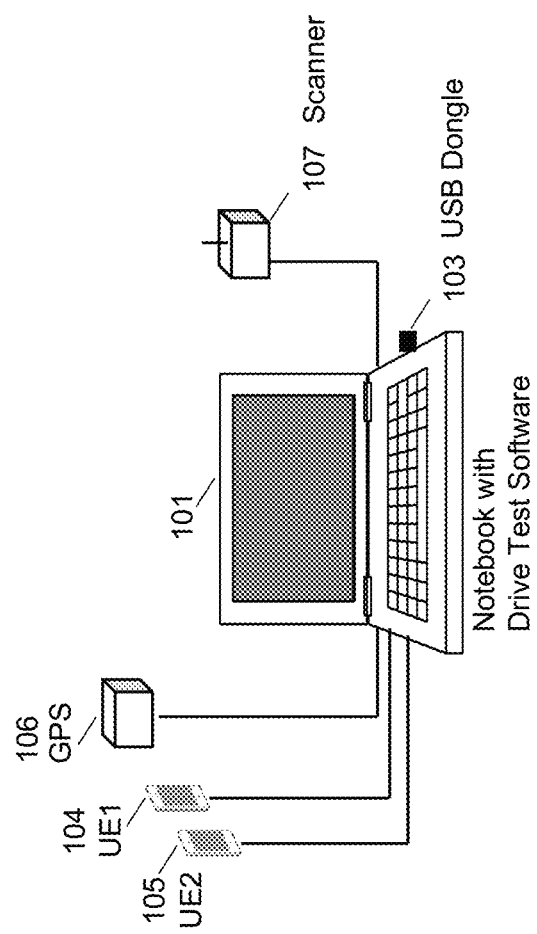
FIG. 1 shows a conventional drive test system.

FIG. 1 shows a conventional drive test system. Notebook 101 is equipped with drive test software, and is connected to each of: USB dongle 103; a first user equipment (UE) 104; a second UE 105; a global positioning system (GPS) 106; and a radio frequency (RF) scanner 107. In this conventional drive test system, a laptop with multiple connected UEs is used to collect data as a driver moves around in the coverage area. However, this is limited to the specific routes determined by the operator (as used herein, meant to mean a human operator of the collection device or the entity performing the collection). Collection of data beyond the specified routes is difficult and requires at least the cycle time of: determining that a new test route is needed; determining the parameters for the new test route; performing the new test in its entirety; returning to headquarters and downloading the test data; and processing the test data. As it is expensive to perform this testing, operators are only able to perform this once or twice a year, and it is difficult to perform adequate testing for the entire network.

Continuing on, data from the drive test is analyzed later in a post-drive test analysis system, which is slow and cumbersome. Once the data is downloaded to the test analysis system, the data results in an optimization report, which is reviewed by a human, who then may make a manual change to the network.

However, there is a need for information to be collected instantaneously, or over time, at specific coverage areas that are not covered by the existing test routes, with a shorter cycle time than the specified cycle time.

The inventors have understood and appreciated the following.

A mobile base station has backhaul, so data download can be continuous. This enables drive testing to be enhanced by reducing cycle time, even to the point that dynamic optimization is possible. Dynamic optimization (either with dynamic upload, or not) is possible using an enhanced drive test. By dynamic optimization, the present disclosure contemplates the changing of parameters in the active network based on network parameters determined by the drive test. This can occur within a short cycle time by processing the drive test at the mobile base station or at a coordinating server in the network, with transmission of data via backhaul.

Further, a mobile base station can perform store and forward of data and perform compute at the coordinating server. Where a coordinating server is referred to, a coordinating node, coordinating gateway, SON module, or other server may be contemplated. The coordinating server provides relatively low latency for transmission of the drive test information, in some embodiments, as well as in some embodiments a SON module for closed loop network configuration modification of all nodes coordinated by the coordinating server. The coordinating server may be in communication with the mobile base station (MBS) via wireless backhaul, in some embodiments, and may be in communication via a mesh network or relay network, in some embodiments. Where wireless backhaul or mesh backhaul is used, an appropriate route may be selected by the mobile base station.

Further, a mobile base station has a special UE that can be leveraged at any time to provide detailed drive test information. Either a backhaul UE, or a sniffer UE, or one or more physically connected UEs can be used for this purpose. Further, a mobile base station can collect data from any and all of these UEs that attach to it, and can process the data either at the base station or at the coordinating server. A combination of RF and performance-related parameters can be obtained from the enhanced drive test. In some embodiments, specially-configured UEs that enable access to debugging and test functionality, such as open UEs, may be connected to the mobile base station for collecting drive test information.

In some embodiments, a mobile base station (MBS) is used for the enhanced drive test. The MBS is equipped with a backhaul connection to the core network, including to a The MBS may be configured to send the drive test information in real time to a coordinating server, in some embodiments. The coordinating server may be any server, or may be a control server for the MBS and/or a plurality of MBS nodes. The coordinating server may provide SON for the MBS nodes and may be a coordinating server as described elsewhere herein, in some embodiments.

In some embodiments, the MBS may be equipped with a RF sniffer. The RF sniffer may be the RF sniffer described in U.S. patent application Ser. No. 15/974,669, "Base Station with Interference Monitoring Circuit," hereby incorporated by reference for all purposes. The sniffer may be used to perform RF monitoring of the desired cell network according to the drive test, or may be used to perform monitoring of the surrounding RF environment, in some embodiments. Data from the RF sniffer may be stored along with date, time, and location metadata with the drive test information, in some embodiments.

In some embodiments, the MBS may be equipped with a UE module. The UE module may be a UE modem that is physically and electrically coupled to the MBS. The UE module may be a standard UE modem, controllable by a software interface, or the UE module may be an enhanced UE modem configured to enable enhanced debugging information to be collected and stored with the drive test KPI information.

In some embodiments, various RF parameters may be collected in the enhanced drive test. For example, RSSI, RSCP, RSRP, RSRQ may be collected. In some embodiments, additional parameters may be collected regarding the UE and its connection to the cell network, e.g., modulation and coding scheme (MCS). In some embodiments, receive levels and receive quality measurements may be measured.

The UEs may be 2G, 3G, 4G, or any other RAT open phones that enable collection of additional data beyond what is capable from a normal UE.

In some embodiments, various performance-related parameters may be collected in the enhanced drive test. The performance-related parameters may be defined relative to particular applications: for example, telephone call related parameters could be defined for telephone calls, video streaming related parameters could be defined for video streaming, etc. The particular application may be any higher-level or higher-layer application that uses network access. For example, a video chat application may be able to be assessed using the enhanced drive test using various parameters, such as: latency; video quality; audio quality; or other parameters (key performance indicators or KPIs) specific to the application. For example, pinging a server, measuring latency and throughput to a server, counting a number of successes or failures of an attempt to access a server or complete a call, assessing completion and throughput of a call, assessing completion and throughput of a file transfer is contemplated. These parameters can be different from parameters for the underlying mobile telephone network connection. Multiple phones may still be required, depending on what is required to test.

The measurements obtained using the described enhanced drive test, in some embodiments, may be used to adjust or change the configuration of the network. RF transmission power, antenna realignments, optimization of a "pipe" or transport between the core network and a particular base station, changes to network parameters such as packet or frame sizes, queue depths, and other parameters may be adjusted.

In some embodiments, capacity of the network may be adjusted in various ways, for example by determining whether a minimum service quality is met at a specific number of users, which may result in a report to change a configuration parameter of the network or, in some embodiments, an closed-loop or automatic configuration change without human intervention. A certain quality control may be held, in some embodiments.

In some embodiments, the enhanced drive test may be used to design and build a mobile network, to perform drive tests when new buildings are built or when buildings are torn down, to assess whether network conditions have changed, to assess network quality for specific lines of sight, to assess particular drive routes, etc. Drive routes may be selected based on popularity or busyness.

In some embodiments, a fleet of vehicles may be used for drive testing. For example, a fleet of vehicles equipped with enhanced mobile base station (MBS), for example a fleet configured for public safety personnel, may be modified for use with the enhanced drive test described herein. As the fleet of vehicles is constantly in use to cross the country, drive tests could be constantly performed by the fleet.

In some embodiments, uploading information may require significant capacity or load. The base station may assign a particular quality of service parameter (QoS or QCI or DSCP, in some embodiments) to mitigate the impact of a large data upload on the network. Uploads may be queued and performed at a central location with high backhaul bandwidth, such as a location with Wi-Fi, in some embodiments. A mesh network may be used for backhaul, and the mesh network node may be used when it provides backhaul capacity at a certain threshold. Backhaul link throughput or performance may be checked for capacity from time to time, in some embodiments. In some embodiments, mesh bandwidth may be estimated for purposes of determining whether an upload of collected data should be performed. Estimation may be a historical bandwidth estimate, and may be used for prioritization or admission control.

In some embodiments, automatic throttling or control of upload may be based on the GPS position of the MBS. In some embodiments, the drive test information may itself be pre-computed at the MBS and used to determine whether upload of the collected information should be performed at any given time or location.

In some embodiments, 24×7 testing may be enabled, or additional information could be obtained in addition to existing drive test data. In some embodiments, a large number of drive tests may be conducted at all times continuously, with data being continuously uploaded or uploaded from time to time. In some embodiments, drive tests may be performed by a mobile base station only when its access radio is turned off, to ensure that the mobile base station's own access network does not affect the testing.

In some embodiments, closed loop or immediate, dynamic feedback may be performed via a SON server, which may be located at the coordination server described herein, in some embodiments. In one embodiment, data from the drive test may be sent to a coordinating server, the coordinating server may process the drive test data, and the results of the enhanced drive test may be sent to the SON server and the SON server may perform adjustment to the network, for example power control.

A variety of scenarios are contemplated by the inventors. Each scenario contemplates the use of an appropriate embodiment. In a first scenario, more and more granular data is collected. In a second scenario, enhanced drive tests may be used to provide data where existing drive tests have not been available. In a third scenario, indoor testing may be performed. In a fourth scenario, enhanced drive testing may provide dynamic coverage optimization for first responders or for ordinary users. In a fifth scenario, enhanced drive testing may dynamically assist the creation of a mesh network. In a sixth scenario, an enhanced UE may be used for walk testing by first responders. In a seventh scenario, drive test information may be used to indicate whether a mesh node should be activated. In an eighth scenario, a regulatory requirement may measure KPIs using a MBS drive test. In a ninth scenario, interference from a MBS may be assessed. In a tenth scenario, surveillance may be performed of UEs at the MBSs for drive tests.

In a first scenario, in some embodiments, more data, and more granular data, is collected. An enhanced drive test may be performed at a higher frequency than the typical drive test. This may be enabled by the lower cost of the enhanced drive test. In some embodiments this may involve continuous driving by MBSes in public safety vehicles, which typically end their day at a collection depot that may be repurposed for downloading drive test data, or even may involve continuous data collection of UEs equipped with special software. If a daily, hourly, or otherwise highly frequent drive test is performed, periodic data can be collected and may be used to optimize network parameters, such as those described in U.S. Pat. Pub. No. US20160135132, "Self-Calibrating and Self-Adjusting Network," hereby incorporated by reference in its entirety, as an example. For example, the network patterns generated by a weekly farmer's market could be identified and predicted using suitably frequent drive test data.

In a second scenario, in some embodiments, enhanced drive tests may be used to provide data where existing drive tests have not been available. First, a geographic location where there is a paucity of data can be identified, either via an offline process, a dynamic process, manually, or via reports. A public safety or police vehicle containing a MBS may be dispatched to the location. In some embodiments the MBS may perform measurements itself and send the information back (i.e., may perform a drive test). In some embodiments the MBS, as a base station, may turn on, solicit UEs to attach, and request measurement reports from those UEs to obtain information to be used as a drive test.

In a third scenario, in some embodiments, indoor testing may be performed. Indoor testing is valuable because of its frequency of use (80% of usage is indoor), and because typical drive testing is ineffective indoors (walls are a barrier to radio signals). This may be performed using UEs equipped with testing software. The UEs may be standard UEs or specially-equipped UEs, such as public safety UEs. The UEs may perform testing using the special app, and may send the testing information to the MBS, which may serve as a collection point. The MBS may subsequently process the data in whole or part, or may subsequently upload the data to a coordination server.

In a fourth scenario, in some embodiments, enhanced drive testing may provide dynamic coverage optimization for first responders or for ordinary users. Evacuation sites may require additional power, spectrum, or resources. In the event of such an emergency, existing cell sites may go down, resulting in a need to perform real-time drive testing to understand the state of the network. The present disclosure may harness regular user UEs to derive drive test information. The test information may result in provisioning of power, spectrum, or resources effective with sufficient resources to handle traffic and user volume.

In a fifth scenario, in some embodiments, enhanced drive testing may dynamically assist the creation of a mesh network, for example, during emergencies or disasters. Mesh base station nodes may be used for coverage as well as for backhaul, in accordance with some embodiments, such as described in U.S. Pat. Pub. US20140233412A1, hereby incorporated by reference. Enhanced drive test information may be used to dynamically assist the creation of the mesh network. A first mesh node may be deployed, and may then be used to perform drive testing. The first mesh node may upload the data to a coordinating server, or may process the information locally. Once a drive test is performed, the information may be used for a variety of purposes, including identification of locations for setup of additional mesh nodes, either for coverage or backhaul, or identification of a location where a public safety vehicle should be dispatched, or other purposes. In some embodiments, a visual heatmap may be sent to an application running on a UE, or on a mobile vehicle system, or on a public safety vehicle device such as a law enforcement laptop, or on a car satellite navigation system, etc. In some embodiments, drones could be used for adding mesh nodes.

In a sixth scenario, in some embodiments, an enhanced UE may be used for walk testing by first responders. A thin client application may be installed on first responder UEs. The UEs could provide walk testing information. If entering a building, the UEs could provide walk testing information indoors and may also enable location tracking of the UEs. In some embodiments, buildings could be marked in software such that first responders are alerted to not enter into particular buildings, for example, for buildings that have known poor signal or are in danger of collapse.

In a seventh scenario, in some embodiments, drive test information may be used to indicate whether a mesh node should be activated. In trying to determine whether to light up a first responder base station when the vehicle comes in and stops, a priori information may be used that is available about coverage, either at a MBS, a mesh node, or at a centralized coordination server to automatically decide whether to light up a new mesh node. Current or historical coverage information, available at any server, including in the coordination server or data aggregation server, could be used to automatically decide whether to light up a MBS. An operator of a MBS, which could be a driver of the vehicle in which the MBS is configured, could be provided with an indication, visual, auditory or otherwise, whether to light up the new mesh node, where, and/or what configuration parameters to use.

In an eighth scenario, in some embodiments, a regulatory requirement may measure KPIs using a MBS drive test. In the case that an operator is required to provide 95% coverage of an area, for example, complete measurement is difficult to achieve, and therefore the methods used in the present disclosure could be used.

In a ninth scenario, in some embodiments, interference from a MBS may be assessed. When a mobile base station sets up its own cell, it may potentially cause interference. The MBS may be configured to perform a drive test according to the present disclosure. A UE may attach to this mobile base station, and this UE may be in range of another base station/macro, for which drive test information is obtained, thereby to determine the interference caused by the MBS. This UE sends, e.g., measurement reports and neighbor data to a data collector at the MBS, which assesses this real-time "drive test" interference information to reduce the power output of the MBS. In some embodiments the evaluation and computation is performed at another location, such as a coordinating server or SON module.

In a tenth scenario, surveillance may be performed of UEs at the MBSs for drive tests. Vehicles with MBS and drive test information may be provisioned throughout the area. The MBSes may cause UEs to attach to them, resulting in an ability to track and surveil the location and usage activity of the UEs. In some embodiments this may be used for Wi-Fi, or for any applicable RAT UE.

Figure 2:
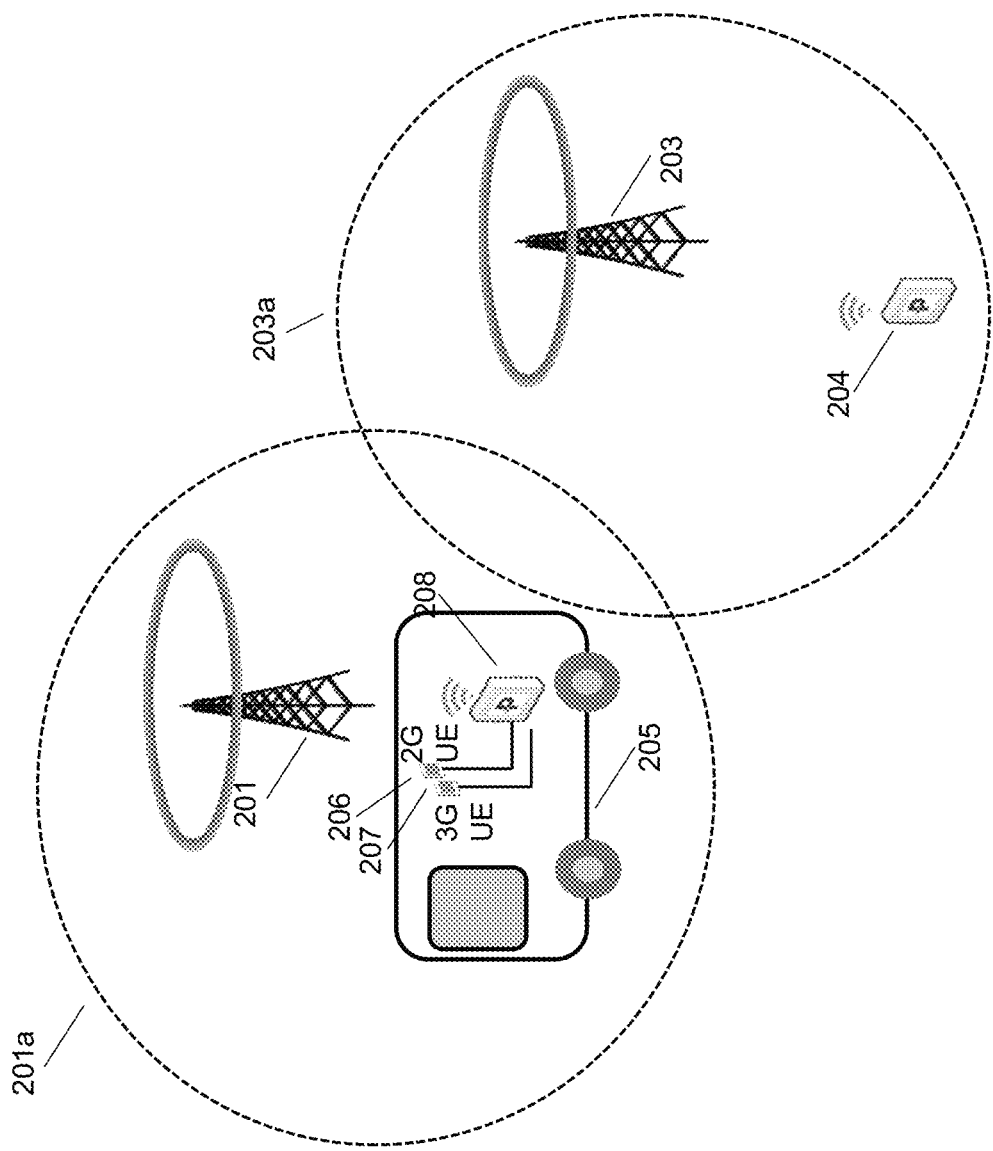
FIG. 2 shows an exemplary architecture, in accordance with some embodiments.

FIG. 2 shows an exemplary architecture, in accordance with some embodiments. Cell 201 creates coverage area 201*a*. Cell 203 creates coverage area 203*a*. Small cell base station 204 also creates interference in the area. Vehicle 205 hosts mobile base station 208, which is coupled to 2G UE 206 and 3G UE 207. In operation, mobile base station 208 drives around along with vehicle 205. Throughout coverage area 201*a*, it is able to provide drive test information about cell 201. Throughout coverage area 203*a*, it is able to provide drive test information about cell 203 as well as small cell 204. In the intersection of coverage area 201*a* and 203*a*, the mobile base station 208 is able to provide drive test information about handover related measurements, including RF signal measurements and performance measurements. UEs 206 and 207 may each provide drive test information for one RAT, in some embodiments, and may provide the drive test information to MBS 208, in some embodiments, which may use its backhaul connection (not shown) to upload the data dynamically to a coordinating server (not shown), or which may transfer the data to a processing server located within the vehicle, or which may perform processing of the data at the mobile base station, or some combination of these options. The mobile base station may broadcast an access network. The mobile base station may also not broadcast an access network if being used solely for drive testing.

Figure 3:
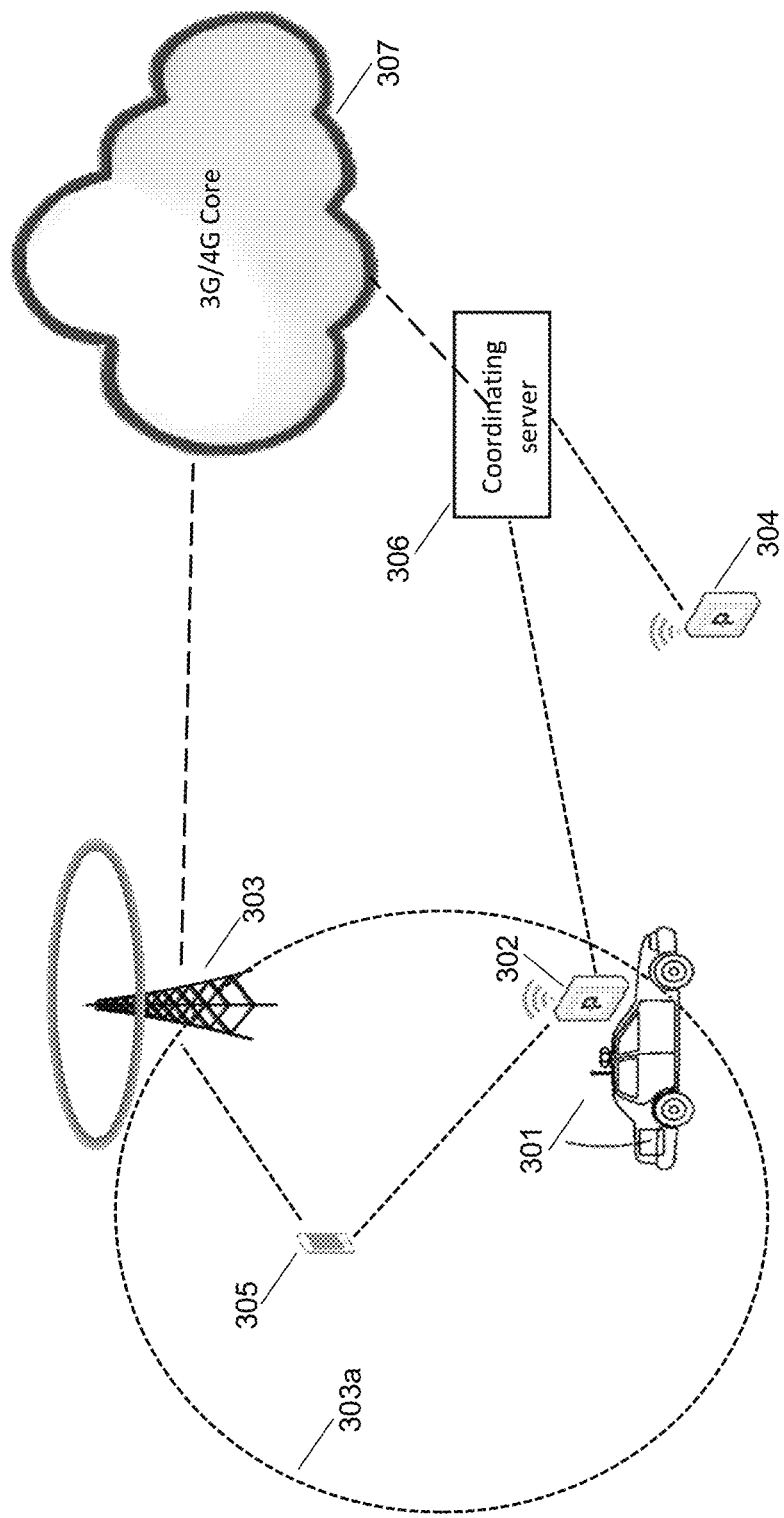
FIG. 3 shows a second exemplary architecture, in accordance with some embodiments.

FIG. 3 shows a second exemplary architecture, in accordance with some embodiments. Base station 303 creates coverage area 303*a* and is coupled to core network 307. UE 305 may be located in coverage area 303*a*. Mobile base station 302 in vehicle 301 is coupled to core network 307 as well, via gateway 306, which may be a coordinating server as described herein, and which may provide SON, additional processing capability, coordinating capability, etc., as well as virtualization, SON, proxy, interoperability, and other features as described in the documents incorporated by reference hereto. Coordinating server 306 may also provide coordination and other services to small cell base station 304.

In operation, small cell base station 302 may perform drive testing and may transfer drive test data to coordinating server 306 for processing, in some embodiments. In some embodiments, this data may be processed at server 306, and the results dynamically fed back to a SON module at server 306 for directing, e.g., small cell base station 304 to power on to provide additional coverage, or for directing the small cell 302 in the vehicle to alter performance parameters. In some embodiments, this data may be processed at server 306, and used to identify configuration changes to be sent to core 307 to cause, e.g., base station 303, which is not managed by coordinating server 306, to increase or decrease power, for example. In some embodiments, an X2 protocol or other standard protocol (e.g., Xx, Xn, or any other protocol) may be used by coordinating server 306 to cause base station 303 to alter its configuration or behavior. In some embodiments, the drive test may be performed by monitoring at base station 302. In other embodiments, the drive test may be performed using some combination of data collected at UE 305 and base station 302.

Figure 4:
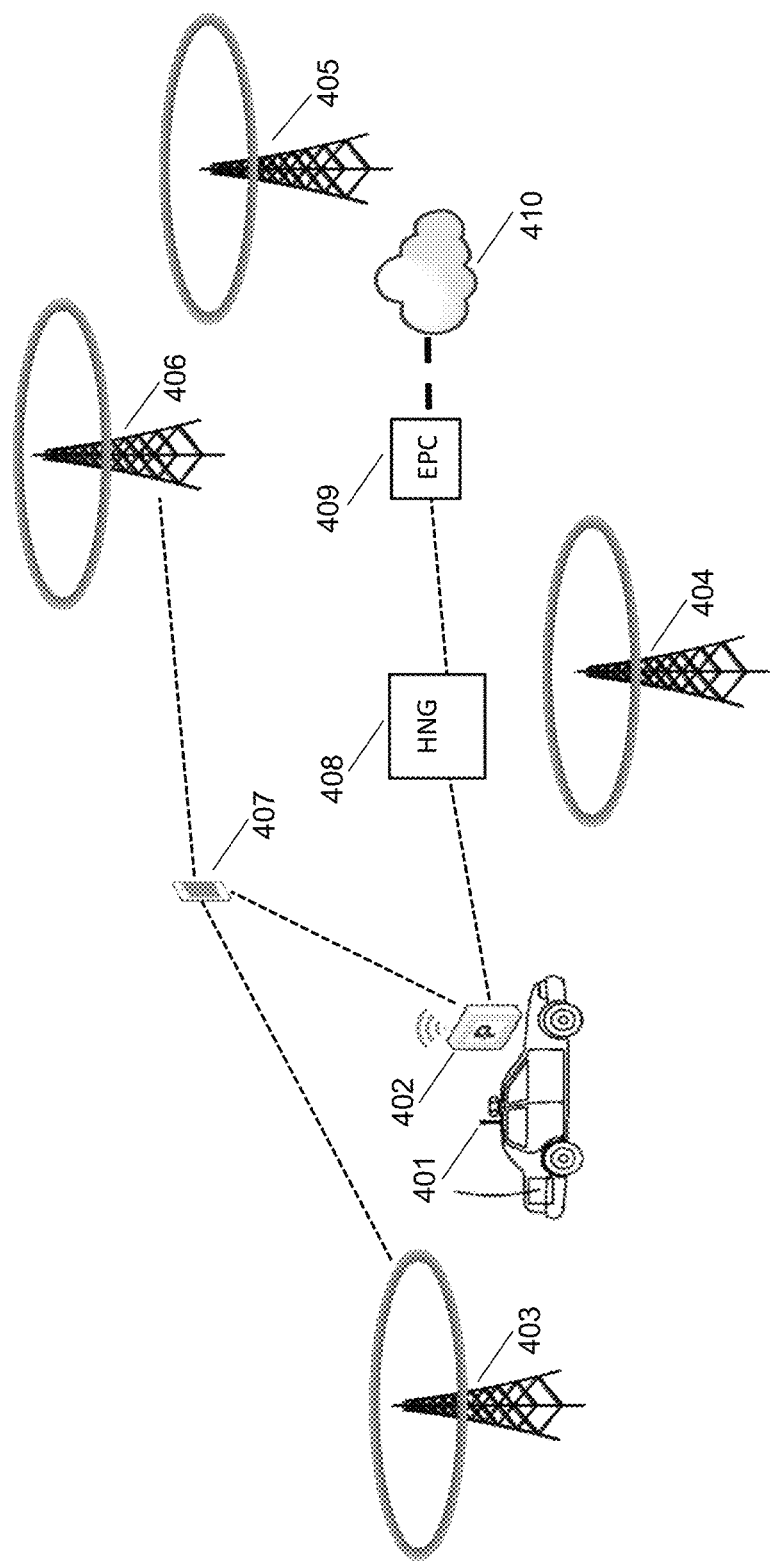
FIG. 4 shows a third exemplary architecture, in accordance with some embodiments.

FIG. 4 shows a third exemplary architecture, in accordance with some embodiments. A cell network includes base stations 403, 404, 405, and 406, along with evolved packet core 409, which is coupled to the public Internet and/or other networks 410. Vehicle 401 is equipped with mobile base station 402, which drives around the area and sends collected drive test information to gateway/processing node/coordinating server 408, which is coupled to EPC 409 to upload data, to provide coordination and closed loop feedback regarding base stations in the network to EPC 409, or both. In operation, base station 402 may cause UE 407 to attach and may cause UE 407 to send information to the MBS, including RF information and performance information. In some embodiments, MBS 402 may directly collect the RF and performance information. In some embodiments, UE 407 may be configured with an app that collects the RF and performance information and sends it to base station 402 for analysis. In other embodiments, UE 407 may send measurement reports as requested by base station 402.

Figure 5:
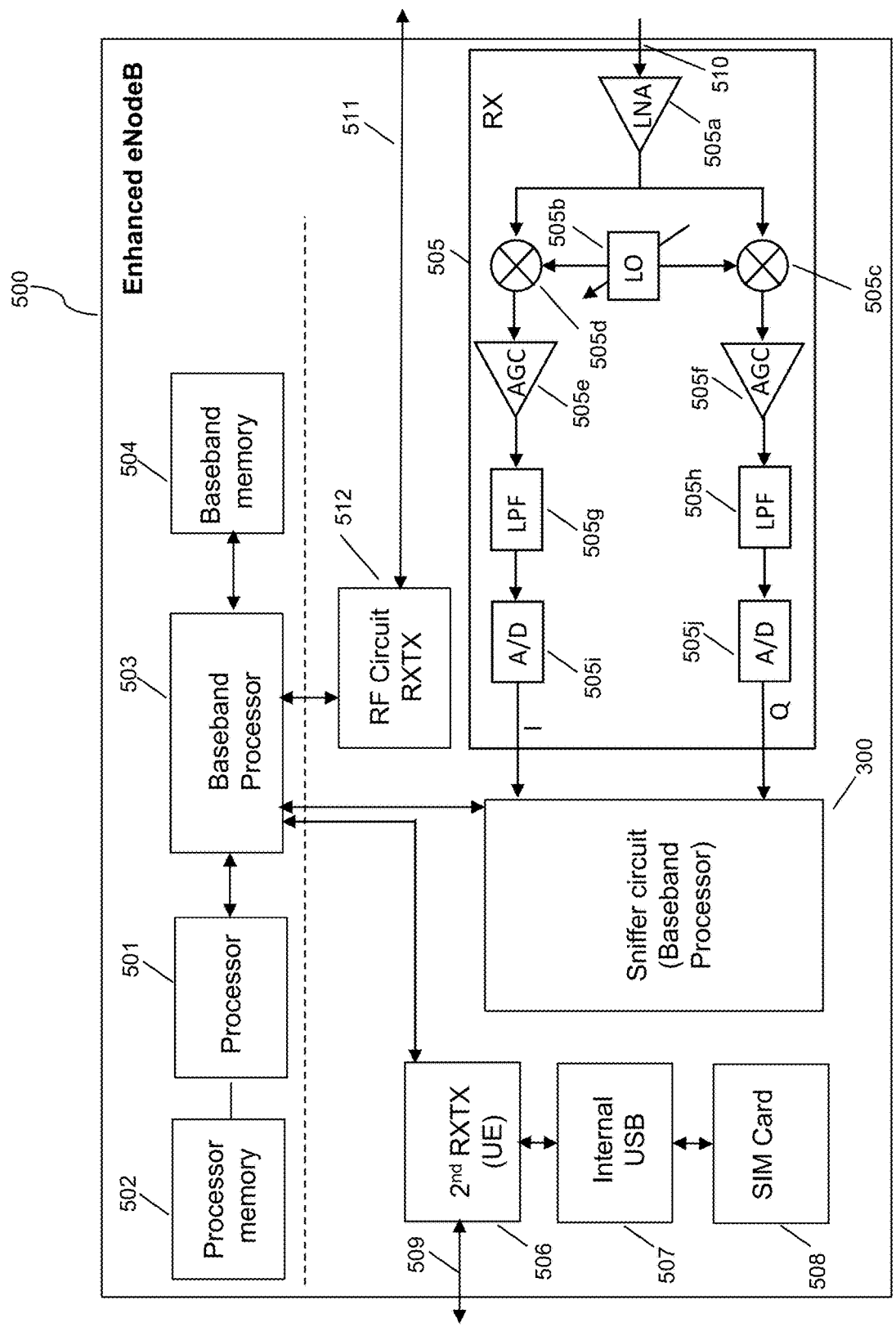
FIG. 5 is a block diagram of an exemplary in-vehicle base station, in accordance with some embodiments.

FIG. 5 is a block diagram of an exemplary in-vehicle base station, in accordance with some embodiments. An exemplary in-vehicle base station 500 or eNodeB 500 may include processor 501, processor memory 502 in communication with the processor 501, baseband processor 503, and baseband processor memory 504 in communication with the baseband processor 503. The eNodeB 500 may also include first radio transceiver 505 and second radio transceiver 506, internal universal serial bus (USB) port 507, and subscriber information module card (SIM card) 508 coupled to USB port 507. In some embodiments, the second radio transceiver 506 itself may be coupled to USB port 507, and communications from the baseband processor may be passed through USB port 507. The second radio transceiver may be used for wirelessly backhauling eNodeB 500. The second radio transceiver 506, or the sniffer circuit 300, may be used in some embodiments to obtain data about the network (e.g., to collect the drive test data) as described herein, in some embodiments.

Processor 501 and baseband processor 503 are in communication with one another. Processor 501 may perform routing functions, and may determine if/when a switch in network configuration is needed. Baseband processor 503 may generate and receive radio signals for both radio transceivers 505 and 506, based on instructions from processor 501. In some embodiments, processors 501 and 503 may be on the same physical logic board. In other embodiments, they may be on separate logic boards.

Processor 501 may identify the appropriate network configuration, and may perform routing of packets from one network interface to another accordingly. Processor 501 may use memory 502, in particular to store a routing table to be used for routing packets. Baseband processor 503 may perform operations to generate the radio frequency signals for transmission or retransmission by both transceivers 505 and 506. Baseband processor 503 may also perform operations to decode signals received by transceivers 505 and 506. Baseband processor 503 may use memory 504 to perform these tasks.

The first radio transceiver 512 may be a radio transceiver capable of providing LTE eNodeB functionality and may be capable of higher power and multi-channel OFDMA. The first radio transceiver 505 may be a radio transceiver capable of providing LTE eNodeB functionality and may be capable of higher power and multi-channel OFDMA. The first radio transceiver 512 may also be referred as a base station access radio in this disclosure. The second radio transceiver 506 may be a radio transceiver capable of providing LTE UE functionality and may also be referred to as a user equipment module. Both transceivers 512 and 506 may be capable of receiving and transmitting on one or more LTE bands. In some embodiments, either or both of transceivers 512 and 506 may be capable of providing both LTE eNodeB and LTE UE functionality. Shown in the FIG. 5, a RF receiver circuit 505 coupled to processor 501 via a Peripheral Component Interconnect-Express (PCI-E) bus, and/or via a daughter-card. As transceiver 506 is for providing LTE UE functionality, in effect emulating a user equipment, it may be connected via the same or different PCI-E bus, or by a USB bus, and may also be coupled to SIM card 508. First transceiver 512 may be coupled to first radio frequency (RF) chain (filter, amplifier, antenna) 511 (components not shown in the figure), and second transceiver 506 may be coupled to second RF chain (filter, amplifier, antenna) 509 (components not shown in the figure). In some embodiments, components of the RF chain may be shared by a plurality of transceivers, receivers, and/or transmitters.

SIM card 508 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or another parameter needed to identify a UE. Special parameters may also be stored in the SIM card or provided by the processor during processing to identify to a target eNodeB that device 500 is not an ordinary UE but instead is a special UE for providing backhaul to device 500.

The RF receiver 505 is further disclosed in accordance with some embodiments. The RF receiver 505 may contain components for I and Q demodulation from the radio frequency input received at antenna. The components shown are exemplary and person skilled in the art may recognize other variation of it. The eNodeB 500 includes a dummy UE 300 or a sniffer circuit 300. In some embodiments, the eNodeB 500 may include a plurality of dummy UE 300. In some embodiments, each sniffer circuit may support a single radio access technology, e.g., 5G, 3G, 4G, or 5G, etc. In some embodiments, the sniffer circuit may support multiple radio access technologies. In some embodiments, the sniffer circuit 300 may be coupled to the RF receiver via a bus. The dummy UE 300, in some embodiments, may be a receive only circuit and takes as input I and Q signal after demodulation of received RF at the antenna interface 510. A low noise amplifier (LNA) 505*a* amplifies a low-powered radio frequency signal. The LNA 505*a* may amplify the signal without significantly degrading the signal-to-noise ratio (SNR). A local oscillator 505*b* may provide input with 90-degree phase difference to mixers 505*c* and 505*d*. The output signal of 505*c* and 505*d* processed through automatic gain control circuit 505*e* and 505*f* and low pass filter circuits 505*g* and 505*h*. The filtered and amplified signal may next be processed through analog to digital conversion via 505*i* and 505*j* and fed as input to the dummy UE 300. The dummy UE 300 as described above in the description may detect nearby neighbor cells. The baseband processor 503 or the processor 501 processes the signals received at the transceiver 505 and also perform scheduling of the signal processing at sniffer circuit 300. While the components shown here for I and Q demodulation are exemplary only, and hence other variations such as implementing the same on a chip, field programmable gate array (FPGA), baseband processor, etc., may also be possible.

Figure 6:
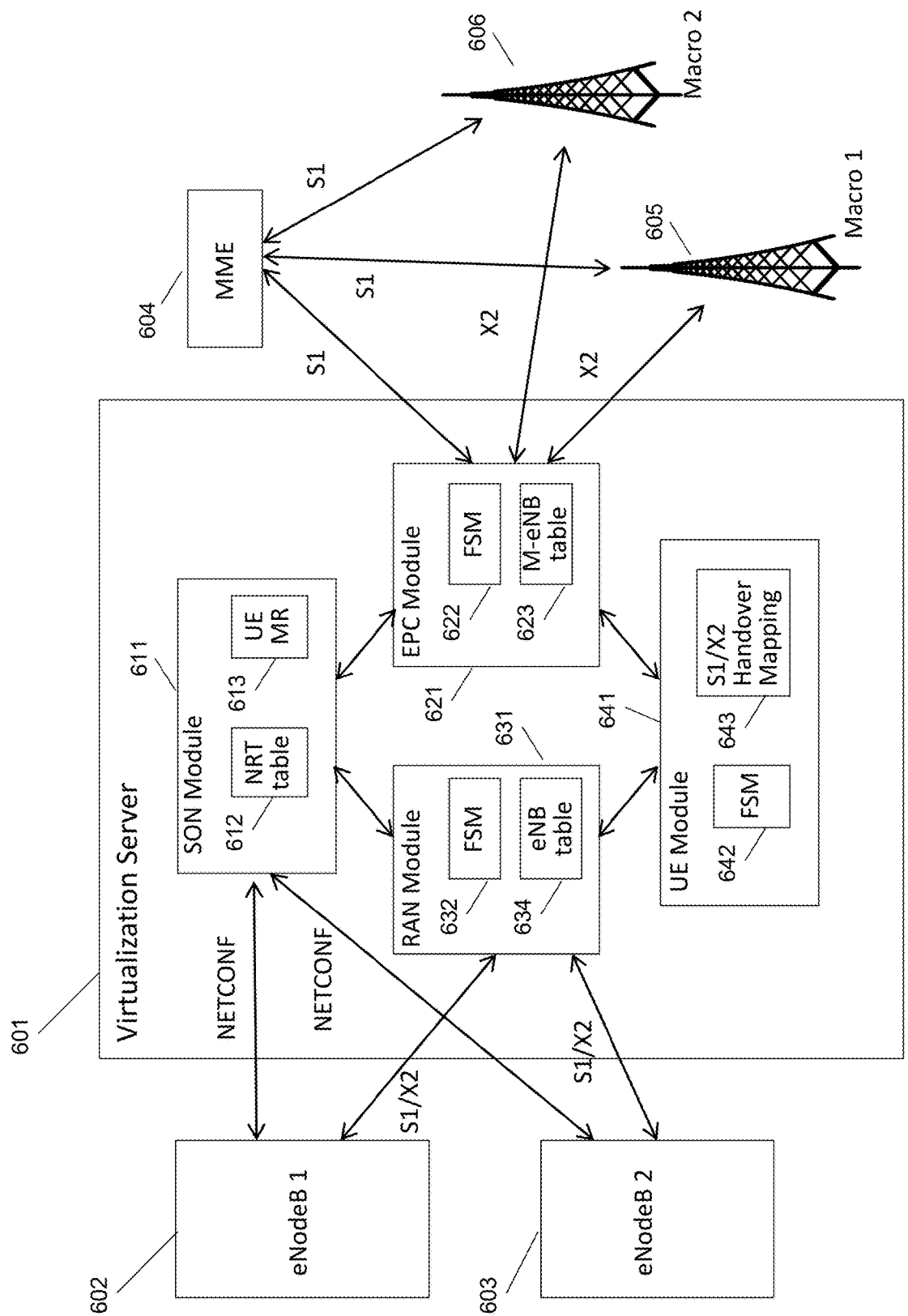
FIG. 6 is a schematic diagram of a coordinating server in a Long Term Evolution (LTE) architecture, in accordance with some embodiments.

FIG. 6 is a schematic diagram of a coordinating server in a Long Term Evolution (LTE) architecture, in accordance with some embodiments. Coordinating server 601, also may be referred as a gateway in this disclosure, provides services to, and is coupled to, eNodeB 1 602 and eNodeB 2 603, on a RAN side of a network (i.e., inside of the gateway). Coordinating server 601 provides services to, and is coupled to, MME 604, macro eNodeB 605, and macro eNodeB 606, on a core network side of the network (outside of the gateway). The eNodeB 1 602 or the eNodeB 2 603 may be in-vehicle base station and may also include dummy UE 300 described earlier. In some embodiments the coordinating server may be a 2G coordinating server, a 3G coordinating server, a 4G coordinating server (LTE coordinating server), a 5G coordination server, a Wi-Fi coordination server, or a heterogeneous, multi-RAT coordination server providing coordination of more than one of the above RATs.

Within coordinating server 601 are self-organizing network (SON) module 607, containing neighbor relation table (NRT) 607*a* and UE measurement report processing module 607*b*; evolved packet core (EPC) module 609, containing EPC finite state machine module 609*a* and macro eNodeB table 609*b*; radio access network (RAN) module 608, containing eNodeB finite state machine module 608*a* and eNodeB table 608*b*; and user equipment (UE) module 610, containing UE finite state machine module 610*a* and S1/X2 handover mapping table 610*b*. Each of modules 607, 608, 609, and 610 are coupled to each other within coordinating server 601, and may execute on one or more shared processors (not shown) coupled with memory (not shown).

In some embodiments, SON module 607 may perform NRT maintenance, load information processing and fractional frequency reuse (FFR) processing; RAN module 608 may perform X2 association management with eNodeBs 602, 603; EPC module 609 may perform X2 association management with macro eNodeBs 605, 606; and UE module may perform X2 handover and S1/X2 translation between eNodeBs 602, 603 and macro eNodeBs 605, 606. All the above managers/modules interact with each other to accomplish the assigned functionality.

The SON module 607 could be used to perform the analysis of drive test data. The drive test data could be received from base stations 602 or 603, which may be the enhanced base stations described herein or could be standard base stations. The analysis of drive test data could be performed by a plurality of SON modules, split across multiple coordinating servers, in some embodiments. The base stations could preprocess the data, in some embodiments.

Alternatives

While the solution described here is using a coordinating server, one skilled in the art may recognize and appreciate that the method disclosed here may be performed using various network nodes. In some embodiments, a drone may be used for a mobile base station, or instead of a mobile base station as a host of the drive test device, in some embodiments.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself. A general purpose processor could be used where a baseband processor is described, for example for low-complexity RATs such as 2G, or vice versa, in some embodiments; a single processor with both general purpose and baseband processing capability could be used. Multiple processors or multiple cores of a single processor, or both, could be used. Data could be shared via an internal Ethernet or packet switch, or via an internal bus architecture. One or more radios could be used, where multiple radios could be used to support multiple RATs, in some embodiments, and where each radio could be specially configured to the specific RAT.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a device having a display, e.g., a CRT (cathode ray tube) or LCD (liquid crystal display) monitor, or any other available monitor types, for displaying information to the user and a keyboard and a pointing device, e.g., touchpad, touch screen, mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a device can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure, feature, or aspect relating to a configuration or embodiment or scenario may apply to all configurations or embodiments or scenarios or one or more configurations, embodiments, or scenarios. A phrase, for example, the phrase "a configuration," may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. For example, drive testing may be performed using a drone. Accordingly, the disclosure of the present invention is intended to be illustrative of, but not limiting of, the scope of the invention, which is specified in the following claims.

The invention claimed is:

1. A method, comprising:
   collecting, at an in-vehicle base station, reports from a plurality of user equipments (UEs);
   storing, at the in-vehicle base station, reports collected from the plurality of UEs into a first database;
   forwarding, from the in-vehicle base station to a coordinating server, stored reports into a second database at the coordinating server;
   performing, at the coordinating server, data analysis of the received reports; and
   sending, from the coordinating server to a base station, an instruction to update at least one configuration parameter of the base station;
   wherein the in-vehicle base station forwards the stored reports to the coordinating server via a wireless backhaul link,
   wherein the reports comprise radio reports and performance reports,
   wherein the radio reports are analyzed for radio frequency planning of a plurality of base stations,
   wherein the performance reports are utilized for improving user applications performance statistics at the plurality of UEs for throughput and latency, thereby improving data collection and data processing for radio frequency cell optimization and wherein the performance reports include location of the in-vehicle base station and measurement of at least one of: throughput, statistics of successful or failed connection attempts, and statistics of call completion at a user equipment (UE);
   determining, at the coordinating server, based on the data analysis, a geographic location having RF measurement statistics below a threshold set by an operator of the core network;
   sending, from the coordinating server to the in-vehicle base station, an instruction to drive to the geographic location; and
   activating, at the in-vehicle base station, radio access network to allow the plurality of UEs to attach to the in-vehicle base station to access the core network
   wherein the collected reports include application performance-related parameters for at least two of telephone calls, video streaming, and file transfer.

2. The method of claim 1, wherein the radio reports include location of the in-vehicle base station and measurement of at least one of: Reference Signal Received Power (RSRP), Reference Signal Received Quality (RSRQ), and a signal quality measurement relating to Signal-to-Noise Ratio (SNR).

3. The method of claim 1, wherein the instruction to update the configuration parameter is at least one of to change transmit power level at the base station, update antenna alignment, handover of a user equipment (UE) of the plurality of UEs to a neighbor base station, allow or deny the UE services of the base station.

4. The method of claim 1, wherein the in-vehicle base station has radio access network deactivated.

5. The method of claim 1, wherein the forwarding, from the in-vehicle base station to the coordinating server, of the stored reports occurs when the in-vehicle base station has backhaul link Quality of Standard (QoS) measurement above a threshold set by an operator of the core network.

6. The method of claim 1, further comprising:
   calculating, at the coordinating server, bandwidth usage of a mesh network of a plurality of base station; and
   determining, at the coordinating server, change in number of base stations of the mesh network.

7. The method of claim 1, wherein at least one user equipment (UE) of the plurality of UEs is running an application to report radio frequency measurements and application performance results to the base station, the base station sends reports from the UE to the coordinating node for performing analysis.

8. The method of claim 1, further comprising sending, from the coordinating server to the in-vehicle base station, instruction to provide radio access to the plurality of UEs upon determining the in-vehicle base is at emergency location.

9. The method of claim 1, further comprising sending, from the coordinating server to the in-vehicle base station, instruction to activate relay mesh node functionality.

10. The method of claim 1, further comprising activating, at the in-vehicle base station, radio access interface for a UE to attach to the in-vehicle base station; and collecting, at the in-vehicle base station, measurement of interference with neighbor cells and radio frequency (RF) measurement reports including one or more of EARFCN, signal strength, PLMN ID, PCI, and ECGI.

11. The method of claim 1, wherein the in-vehicle base station is a multi-radio access technology (multi-RAT) base station supporting at least two access technologies of 2G, 3G, 4G, 5G, Wi-Fi, and WiMax.

12. The method of claim 1, further comprising collecting, at an in-vehicle base station, reports from a plurality of user equipments (UEs) at a sniffer baseband circuit in communication with a primary baseband circuit.

13. The method of claim 1, wherein the application performance-related parameters include at least two of: latency, video quality; audio quality; throughput to a server; successful attempts to access a server; call completions; call throughput; file transfer throughput; file transfer completion.

14. The method of claim 1, further comprising assessing minimum service quality for a specific number of users.

15. The method of claim 1, further comprising assigning a particular quality of service parameter to deprioritize the forwarding of the stored reports to the second database.

16. The method of claim 1, further comprising automatically throttling uploads based on a Global Positioning System (GPS) position of the in-vehicle base station.

17. The method of claim 1, further comprising changing a network configuration relating to one or more of RF transmission power, antenna realignment, optimization of a core network transport, a packet size, a frame size, a queue depth.

18. The method of claim 1, further comprising providing dynamic coverage optimization for a first responder access network.

19. The method of claim 1, further comprising determining whether to activate a mesh network node based on the collected reports.

20. The method of claim 1, further comprising performing closed loop self-organizing network (SON) functionality based on the collected reports.

\* \* \* \* \*